United States Patent
Venäläinen

(10) Patent No.: US 8,117,002 B2
(45) Date of Patent: Feb. 14, 2012

(54) METHOD AND DEVICE FOR MEASURING A VEHICLE

(75) Inventor: Jarkko Venäläinen, Kuopio (FI)

(73) Assignee: Autorobot Finland Oy, Kuopio (FI)

( * ) Notice: Subject to any disclaimer, the term of this patent is extended or adjusted under 35 U.S.C. 154(b) by 0 days.

(21) Appl. No.: 12/800,744

(22) Filed: May 20, 2010

(65) Prior Publication Data

US 2010/0241395 A1     Sep. 23, 2010

Related U.S. Application Data

(63) Continuation of application No. PCT/FI2008/050684, filed on Nov. 25, 2008.

(30) Foreign Application Priority Data

Nov. 26, 2007 (FI) .................................... 20070899

(51) Int. Cl.
*G06F 19/00* (2011.01)
*G01C 9/00* (2006.01)

(52) U.S. Cl. .......................................... 702/92; 702/154

(58) Field of Classification Search ............... 702/92, 702/154; 33/784, 608

See application file for complete search history.

(56) References Cited

U.S. PATENT DOCUMENTS

| | | | |
|---|---|---|---|
| 4,601,105 A | 7/1986 | Yamazaki et al. | 33/180 AT |
| 4,939,848 A | 7/1990 | Armstrong | 33/608 |
| 5,647,139 A | 7/1997 | Richardson | 33/608 |
| 6,598,308 B1 | 7/2003 | Johansson et al. | 33/608 |
| 6,775,639 B1 * | 8/2004 | Mason | 702/152 |
| 7,275,335 B2 | 10/2007 | Holec et al. | 33/784 |
| 2006/0201006 A1 | 9/2006 | Burlingham et al. | 33/284 |
| 2007/0039197 A1 | 2/2007 | Holec et al. | 33/784 |

FOREIGN PATENT DOCUMENTS

| | | |
|---|---|---|
| DE | 196 08 558 A1 | 5/1997 |
| EP | 0 119 876 | 9/1984 |
| EP | 0 350 089 A2 | 1/1990 |
| JP | 080 94304 | 4/1996 |
| SE | 524 543 | 1/2002 |

\* cited by examiner

*Primary Examiner* — Bryan Bui
(74) *Attorney, Agent, or Firm* — Harrington & Smith

(57) ABSTRACT

The invention relates to a method and a device for measuring a damaged vehicle, in which inclination of the vehicle is measured with the measuring device and the measured inclination of the vehicle is used as a datum plane, distances of measuring points (9a, 9b) of the damaged vehicle (8) are measured with a measuring sensor of the measuring device and the measured data are compared to registered reference values of the measuring points, and inclination of the measuring device is measured with an inclination sensor of the measuring device. According to the invention, the measuring device simultaneously measures the distance between the measuring points and the inclination of the damaged vehicle and height difference of the measuring points is calculated from the values of distance between the measuring points and inclination.

2 Claims, 10 Drawing Sheets

US 8,117,002 B2

METHOD AND DEVICE FOR MEASURING A VEHICLE

This application is a continuation of International Patent Application No. PCT/FI2008/050684 filed on Nov. 25, 2008.

The invention relates to a method and a vehicle for measuring a vehicle.

BACKGROUND OF THE INVENTION

When repairing a damaged vehicle, restoring its original dimensions is tried as well as possible. For this purpose, dimensions of measuring points on various sides of the vehicle i.e. distances of measuring points to specific datum points have been measured from undamaged vehicles. The accurate values of length, width and height of these measuring points have been measured and saved in files. These dimensions are utilised when repairing the vehicle. If accurate dimensions are available and they can be utilised, it is easier to repair a damaged vehicle.

There exist measuring devices by which measuring points of vehicles and distances between them are measured. Most measuring devices known recently measure only distances and cannot measure height. Those devices, which include a height measuring function, employ either a mechanical or electronic spirit level or equivalent technique. Then, the measuring device, such as a pair of compasses, is first set on a calibrated datum plane in relation to the inclination of the vehicle, after which the height is measured by moving a measuring head in the vertical direction to the target being measured. An example of such a device is described in patent specification U.S. Pat. No. 7,275,335 (Holec et al.). A height value measured in a way described in the specification is often inaccurate and, as a whole, measuring is slow and awkward. The above technique also prerequisites that the vehicle is on a relatively even base i.e. inclination in relation to the ground is small. Utilising this technique, it is not possible to measure dimensions between measuring points having great height differences, such as e.g. from the top edge of the windshield to the rear corner of the front wing.

The object of this invention is to introduce a method and a device for measuring a vehicle by means of which disadvantages related to recent methods and devices are eliminated. Furthermore, an object of the invention is to introduce a method and a device by which a height value can be measured quickly and reliably. A particular object of the invention is to introduce a method and a device by which distance and height difference between the measuring points of a vehicle can be measured.

DESCRIPTION OF THE INVENTION

In the method according to the invention, a measuring device is calibrated and an inclination of the vehicle is measured in longitudinal and lateral directions, the measured inclination of the vehicle is used as a datum plane, with a measuring sensor of the measuring device are measured distances of measuring points of the damaged vehicle and the measured data are compared to registered reference values of the measuring points, and with an inclination sensor of the measuring device is measured inclination of the measuring device, after calibration first measuring head of the measuring device is directed and set on a measurement target, starting point, chosen from an undamaged area of the vehicle, second measuring head is directed and set on a second measurement target, end point, chosen from an area desired to measure, with the measurement device are simultaneously measured the distance of the measurement points and the inclination of the damaged vehicle, with at least one inclination sensor is measured the inclinations in the directions of two axis at the minimum by measuring the inclinations of at least two axis in the length direction of the profile of the measurement device, whereby the first axis shows the inclination used for calculating the height in the vertical direction and the second axis shows the inclination used for calculating height in the lateral direction in relation to the profile, measuring the damaged vehicle in different directions and points, measured dimensions are transferred to a central processing unit, and height difference of the measurement points is calculated from the values of the starting point, the distance between the measuring points and the inclination.

When the height of a second measuring point (start point) is known, it is possible to calculate based on the measured height difference the height value of a measuring point being measured (end point). The height of the measuring point can be calculated when the datum plane, inclination in relation to it and distance from it are known. A further advantage is that the measurements can be performed reliably irrespective of the position of the vehicle.

The measuring device according to the invention includes a measuring rod including measuring heads movable in relation to each other for measuring distances of measuring points of the vehicle, a central processing unit which includes sensors for measuring distance between the measuring heads and inclination sensors for measuring inclination of the measuring rod, the inclination sensors include at least one sensor measuring at least two axis of the measuring rod or two sensors measuring one axis of the measuring rod for measuring the inclination of the measuring rod both in vertical direction and in lateral direction, the measuring device contains an operating panel for remote-controlling functions and that the central processing unit is arranged to communicate with computers wirelessly.

By means of an inclination sensor, data on the inclination of the measuring rod are obtained immediately and continuously. By means of it and basic data, the height of various measuring points of the vehicle can be measured and calculated.

With the measuring device according to the invention, the measuring points/targets of vehicles and/or other targets can be measured and the values measured with the measuring device can be compared to earlier measured ones and reference values e.g. readable from tables of dimensions. With the measuring device, it is possible to measure the distance of points (e.g. the length between the start and the end point) and the inclination between points from which height difference (the height between the start and the end point) can be calculated. Data are quickly and reliably communicated forward and saved.

DESCRIPTION OF DRAWINGS

The invention will now be described in more detail with reference to the accompanying drawing in which.

Figure 1:
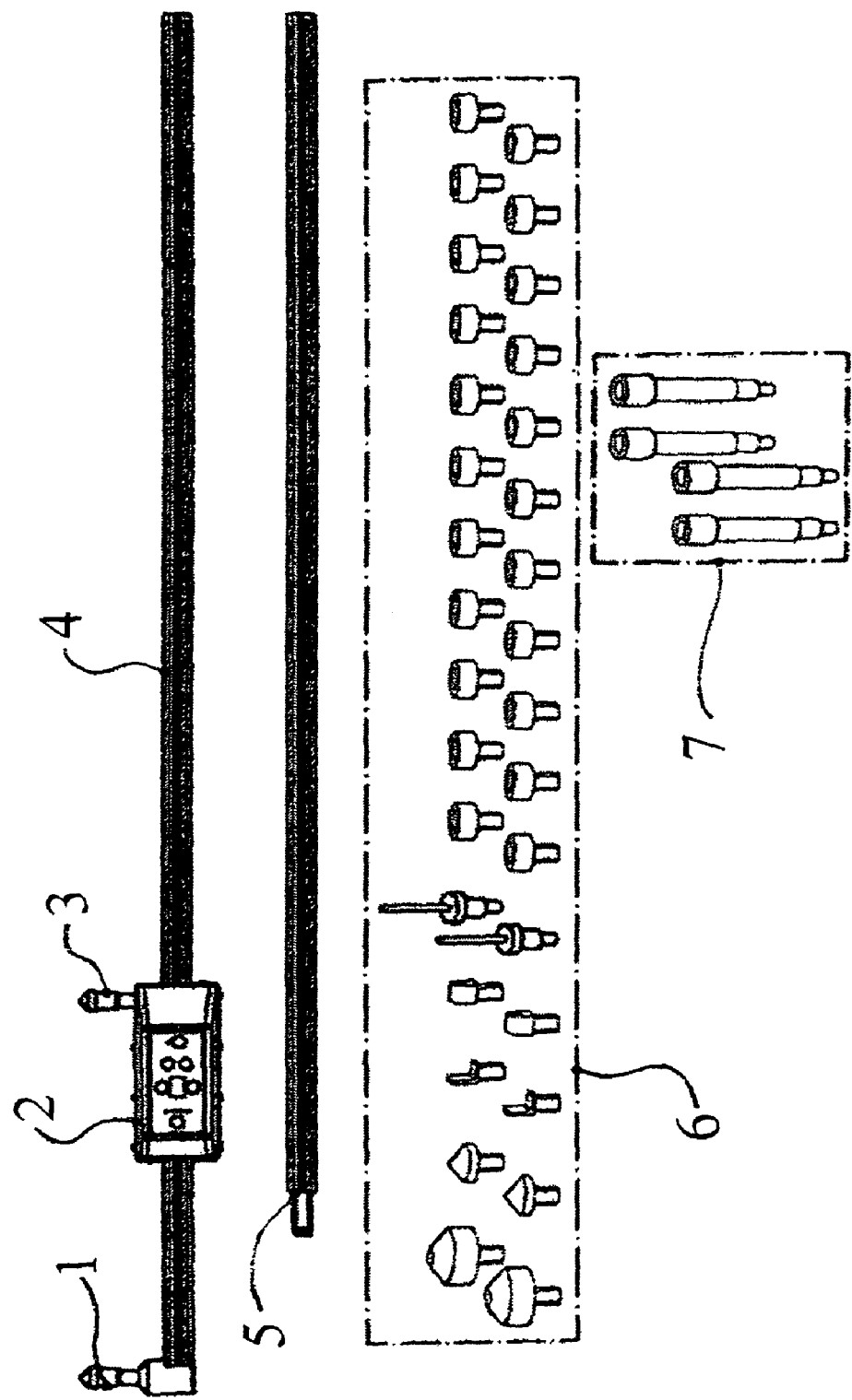
FIG. 1 shows an embodiment of a measuring device according to the invention and parts related to it.
Figure 2:
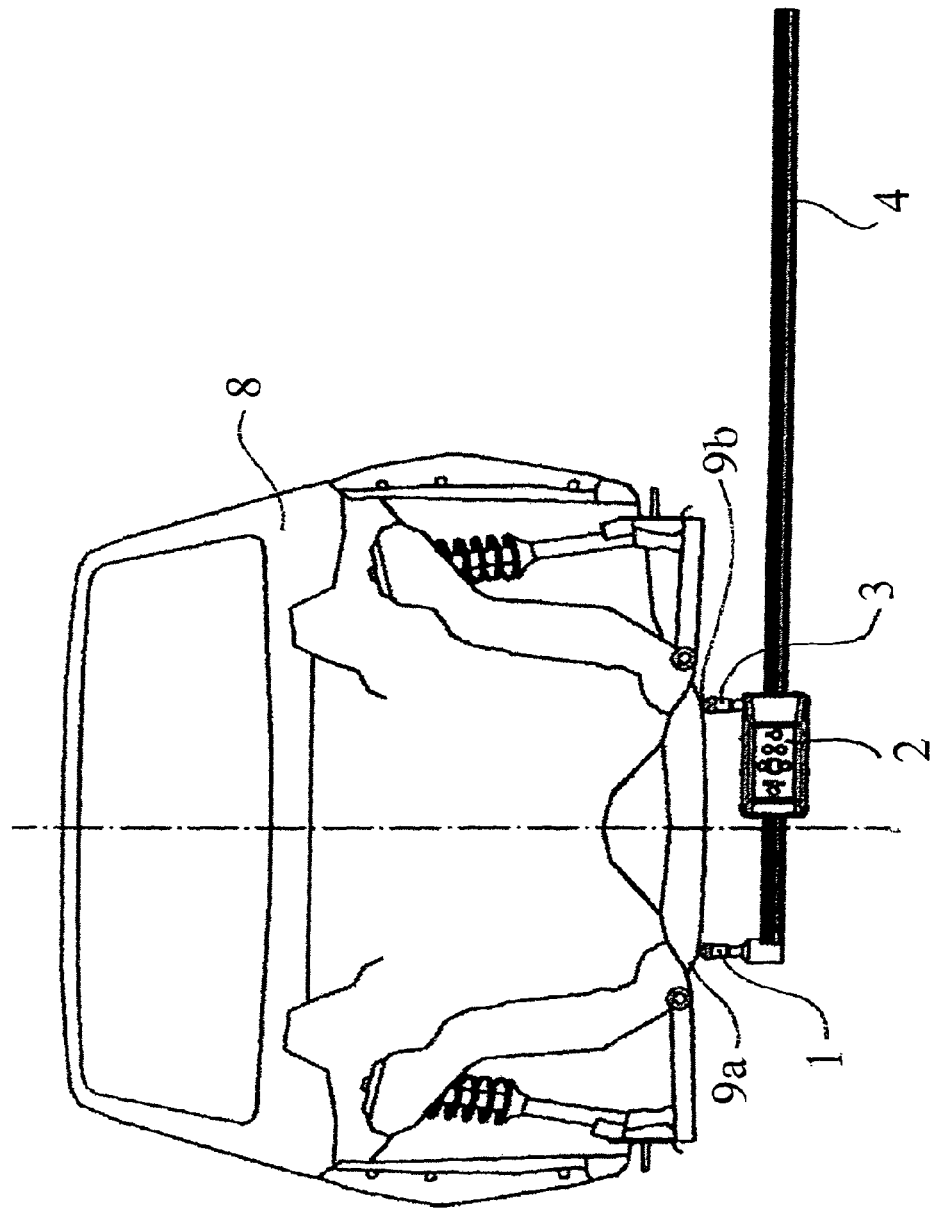
FIGS. 2 and 3 show the calibration of lateral inclination of a vehicle from various points of the vehicle.

A measuring device according to FIG. 1 includes a measuring rod 4 and measuring heads 1, 3 for measuring distances of measuring points of a vehicle. At one end of the measuring rod is fastened a fixed measuring head 1 which is at an angle of 90° in relation to the measuring rod. Furthermore, in the measuring rod is fastened movably in its longitudinal direction a moving measuring head 3 and a central processing unit 2 for monitoring the distance between the measuring heads and the inclination of the rod. The measuring head 3 is fastened in the central processing unit 2 which is moved or slid in the longitudinal direction of the measuring rod. Furthermore, the figure shows an extension rod 5 which is connectable in the measuring rod, whereby its length can be increased as desired. In the measuring heads are fastened measuring probes 6 and the figure shows various structures of measuring probes which can be used case-specifically. Furthermore, the figure shows extension pieces 7 of the measuring head which can be fastened in the measuring rod for increasing the height of its measuring head.

In the central processing unit, there are a length sensor, one or more inclination sensors, necessary means and software for using the device and receiving and communicating data, and a battery or batteries. Furthermore, the central processing unit includes an operating panel of the device. The central processing unit can operate together with a separate computer, whereby there is a wireless connection suitable for the purpose, such as e.g. a WLAN connection, between the central processing unit and the computer.

The inclination sensor(s) contained by the central processing unit will measure and report the inclination of the measuring rod compared to the calibrated datum plane. The inclination sensors include at least one sensor measuring at least two axis of the measuring rod or two sensors measuring one axis of the measuring rod for measuring the inclination of the measuring rod both in vertical direction and in lateral direction. When the measurement software obtains data on the inclination of the measuring rod the measuring heads being directed to the measurement targets, height difference between the measuring points can be calculated by means of trigonometry using the values of length and inclination. The dimension thus calculated is compared to a dimension calculated from the reference values of the table of dimensions and their difference is displayed on a panel of the central processing unit as a deviation of height from the reference value. From the operating panel of the central processing unit, it is possible to control the operation of the measurement software and to view deviations of measured values in relation to reference values in the longitudinal and vertical directions. From the operating panel, it is, inter alia, possible to save the measured dimensions in a database of the measurement software from which a measurement report can be compiled on the display and printed on paper if required.

The longitudinal position of the fixed measuring head 1 at the end of the measuring rod always remains constant in relation to the measuring rod, but the height can vary by using the extension pieces 7. The basic height of the fixed head is e.g. 40-70 mm and it can be increased by using e.g. 100-mm extension pieces. The height of the measuring head 3 at the end of the central processing unit 2 is on the same plane with the measuring head 1, and the height can be equivalently increased by the extension pieces 7 of e.g. 100 mm. In the measurement, measuring probes 6 suitable for the measuring point, indicated by the table of dimensions are employed in the fixed measuring head 1 and the moving measuring head 3.

Next, referring to FIGS. 2-8, the method and the operation of the measuring device will be described.

Calibrating Measuring Device (FIGS. 2-5)

Before the measuring device can be used for measuring a vehicle, the device has to be calibrated. In the calibration, the value of the length of the measuring device is cleared and the inclination of the vehicle is read in the longitudinal and lateral directions.

The longitudinal calibration takes place so that the moving measuring head is brought as close as possible to the fixed measuring head. There are two different ways for the central processing unit to be in the longitudinal profile of the measuring rod: so that the moving measuring head is at the farther edge of the central processing unit or so that the moving measuring head is at the closer edge of the central processing unit in relation to the fixed measuring head. When calibrating length, the above position (the measuring head farther or closer) has to be chosen first in the measurement software and then the clearing/calibration of length. After the calibration of length, the measurement software of the computer recognises the longitudinal position of the moving measuring head in relation to the fixed measuring head.

After length calibration, the inclination of the measuring device is calibrated. In the calibration of inclination, the inclination of the vehicle is measured in longitudinal and lateral directions.

Figure 3:
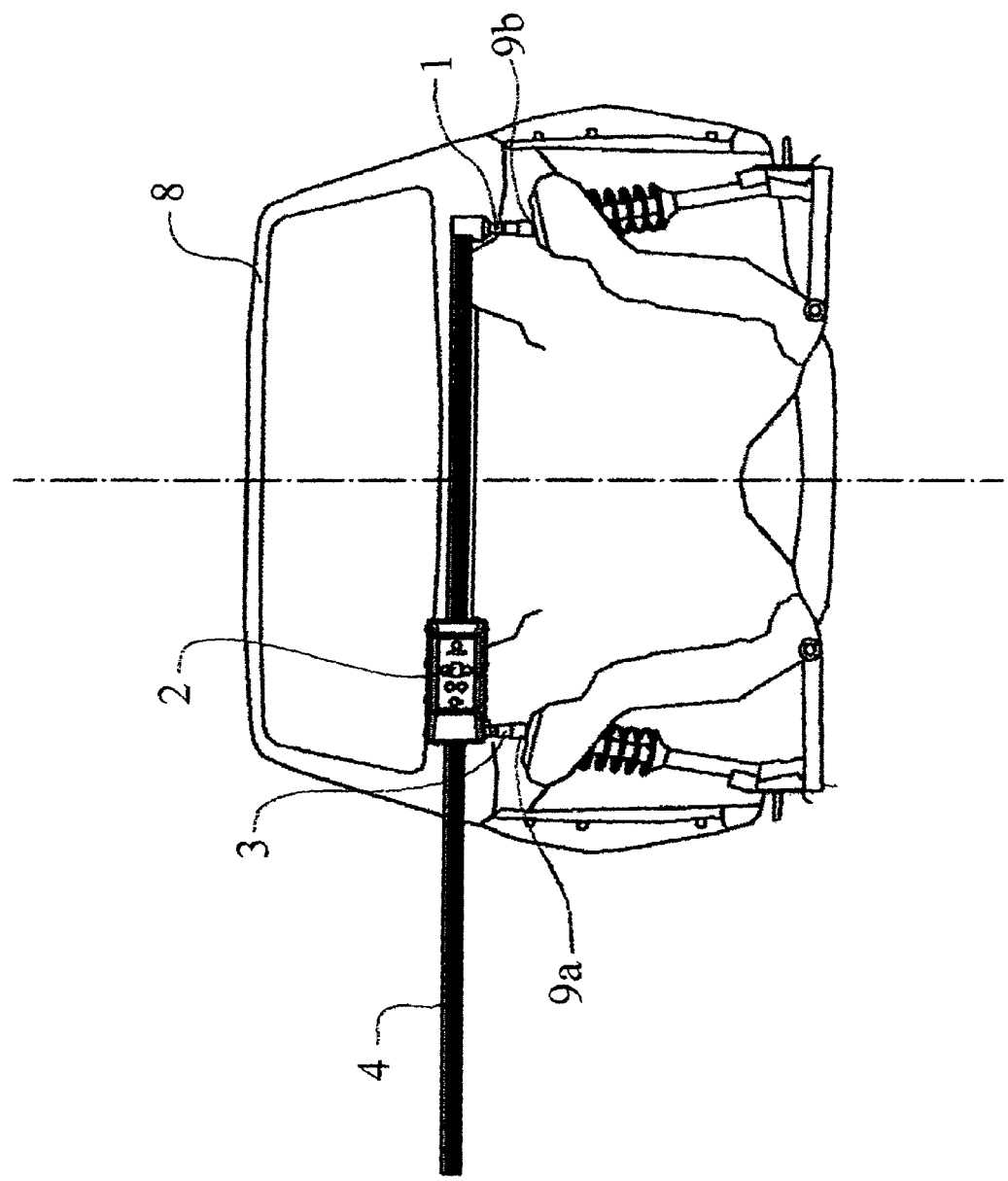
Figure 4:
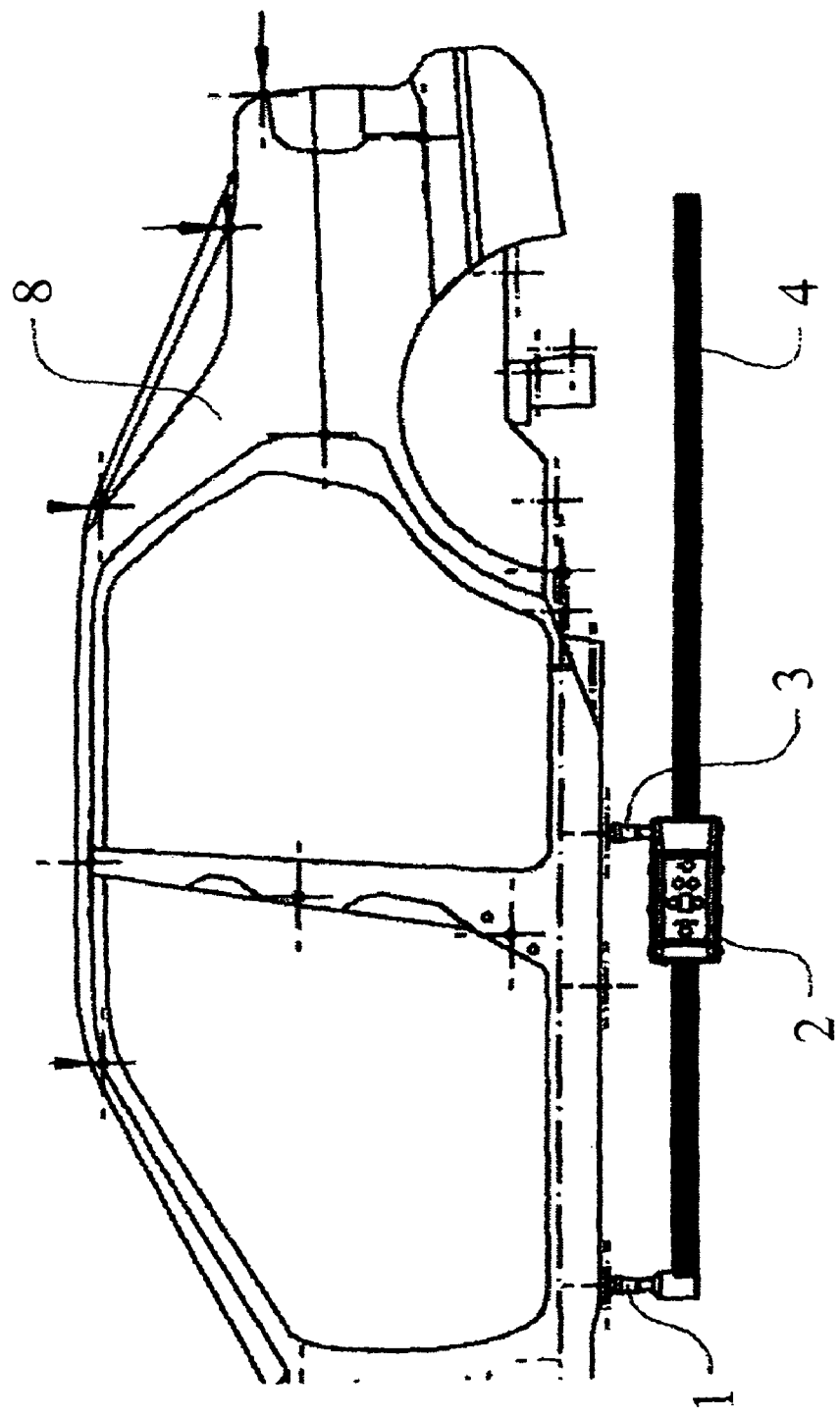
FIGS. 4 and 5 show the calibration of longitudinal inclination of a vehicle from various points of the vehicle.

The calibration of inclination is started by measuring inclination in the lateral direction. The inclination can be read either from the chassis of the vehicle (FIG. 2) or the top structures of the vehicle (FIG. 3). It is recommended that the selection between the top structure and the chassis made in this stage of calibration is kept until the end of calibration, i.e., if the lateral calibration is started in the chassis of the vehicle, also the longitudinal calibration of inclination has to be done in the chassis of the vehicle. In the lateral calibration of inclination, the measuring probes of the measuring device are brought in (vertically) symmetrical measurement targets 9a, 9b on different sides of the vehicle. The most certain way to obtain symmetrical measuring points from different sides is to use measuring points described in a known table of dimensions and to choose those points of them in which the dimensions are the same on both sides (length, width and height). The chosen side of the fixed measuring head (the driver side or the passenger side) has to be entered in the measurement software.

The lateral inclination of calibration can be saved with the buttons of the panel of the measuring device or in the user interface of the measurement software.

Figure 5:
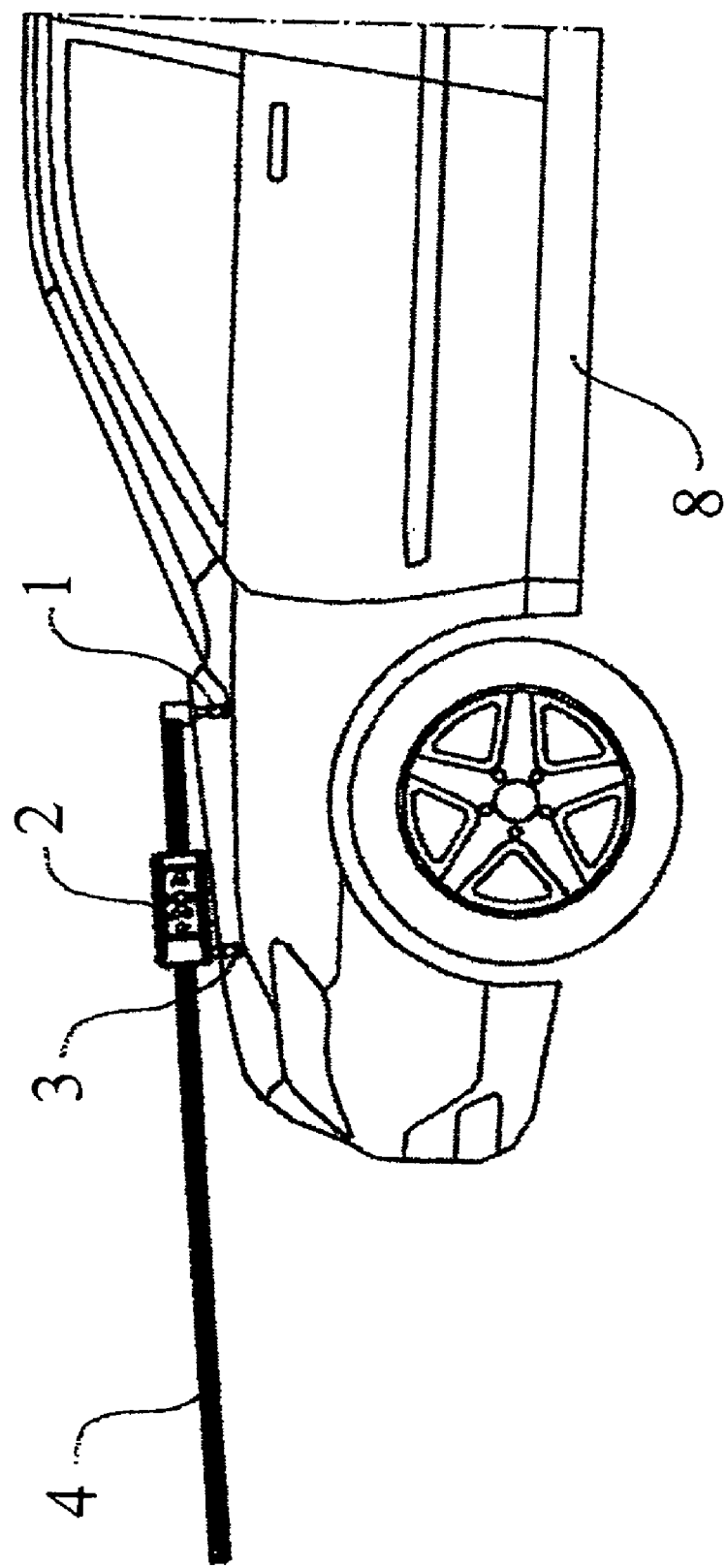

Next, the longitudinal inclination will be calibrated. Measuring the longitudinal inclination takes place by means of a known table of dimensions so that two measuring points are chosen from the table of dimensions on the same side of the vehicle (the driver side or the passenger side). The chosen measuring points have to be in the undamaged part of the vehicle. When the choice of the measuring points has been done, they are chosen as the measuring points of calibration in the measurement software. The longitudinal calibration of inclination can be done from the chassis of the vehicle (FIG. 4) or the top structure of the vehicle (FIG. 5).

The fixed measuring head of the measuring device is directed to the start point chosen in the measurement software and the moving measuring head is directed to the chosen end point. The longitudinal inclination of calibration is saved in the measurement software either in the panel of the measuring device or the user interface of the measurement software.

After calibration, measuring the vehicle 8 takes place so that the fixed measuring head of the measuring device is directed to and set on a measurement target (the start point) chosen from the table of dimensions in an undamaged area of the vehicle, after which the moving measuring head is directed to and set on a measurement target (the end point) chosen from the table of dimensions in an area desired to be measured. The measurement software calculates the length difference and the height difference of the measuring point based on the length and inclination values sent by the measuring device and shows the measured values and compares them to the reference values. When wishing to measure measurement points on the side of the vehicle, a side measuring function of the vehicle is chosen in the software, whereby the software reads the inclination used in calculating the height from the lateral shaft.

Figure 6:
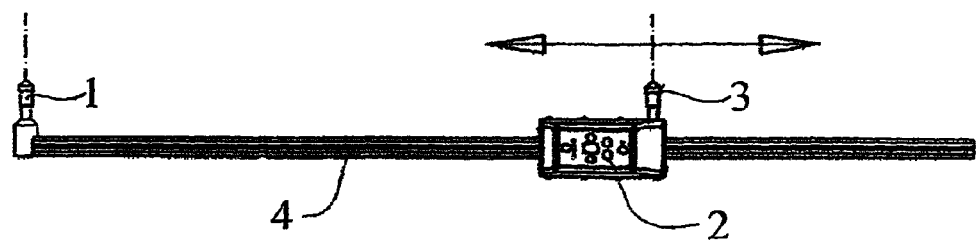
FIG. 6 shows the measurement of length with the measuring device according to FIG. 1, FIGS. 7 and 8 show the measurement of inclination with the measuring device according to FIG. 1, and FIGS. 9-13 show examples of measuring targets measurable with the measuring device.

Measuring Length (FIG. 6)

With the measuring device, length between the fixed measuring head 1 and the moving measuring head 3 is measured. Measuring length takes place with a rotatable pulse sensor in the central processing unit. In the pulse sensor, there is a gearwheel which is pressed by means of spring load in a toothed belt in the longitudinal profile. When the central processing unit 2 is moved in the longitudinal direction of the measuring rod, the toothed belt rotates the pulse sensor and the pulses of the pulse sensor are read in the central processing unit of the measuring device from which they can be read on the computer in the measurement software for displaying the length calculated from the pulses.

Figure 7:
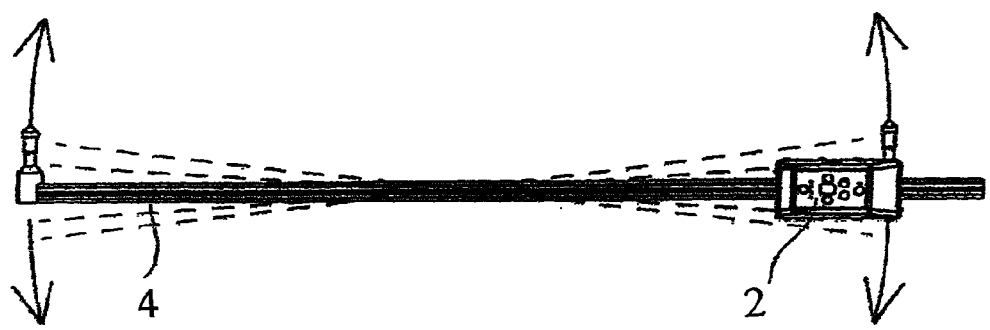
Figure 8:
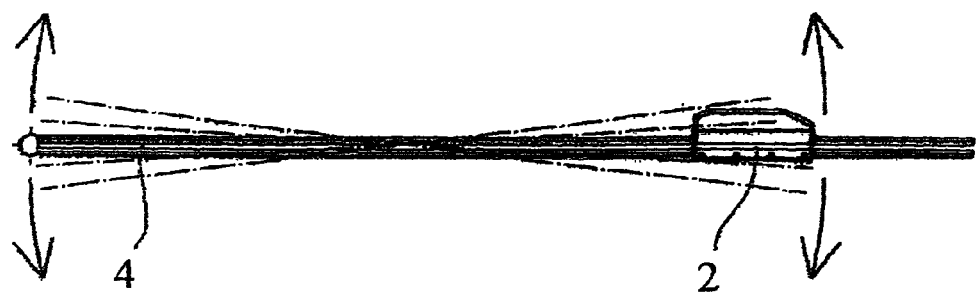

Measuring Height from Inclination Values (FIGS. 7 and 8)

Measuring height takes place by means of the inclination sensor so that the measuring software obtains data from the central processing unit on the vertical inclination of the measuring device. By means of inclination and longitudinal positions obtained from the central processing unit, the measurement software calculates based on trigonometry the height of the moving measuring head in relation to the fixed measuring head. The inclination sensor used in this measuring device reads inclination in the direction of two shafts at the minimum. The first shaft reads the inclination used for calculating the height in the vertical direction, which is shown in FIG. 7. The inclination of this shaft is used when measuring the chassis or the top structures of the vehicle from the top down.

The second shaft of the inclination sensor measures inclination in the lateral direction in relation to the profile, which is shown in FIG. 8. The inclination of this shaft is used for calculating the height when measuring the vehicle from the side, when measuring from the front the measuring device pointing towards the back of the vehicle or when measuring from the back the measuring device pointing towards the front of the vehicle.

The dimensions of the different shafts of the inclination sensor are read to the central processing unit of the measuring device from which they can be read on the computer in the measurement software for displaying the inclination or the height calculated from the inclination and length values.

Figure 9:
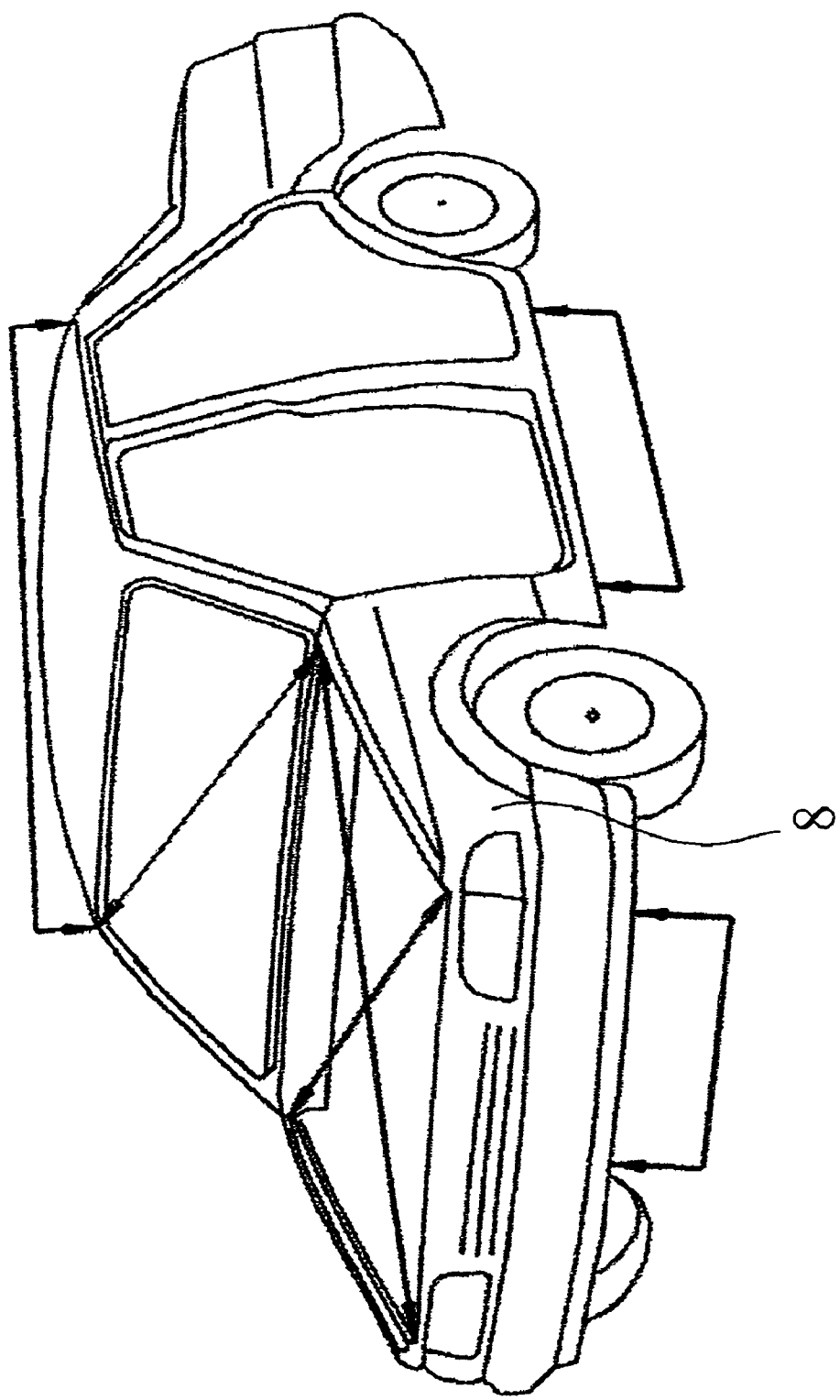
Figure 10:
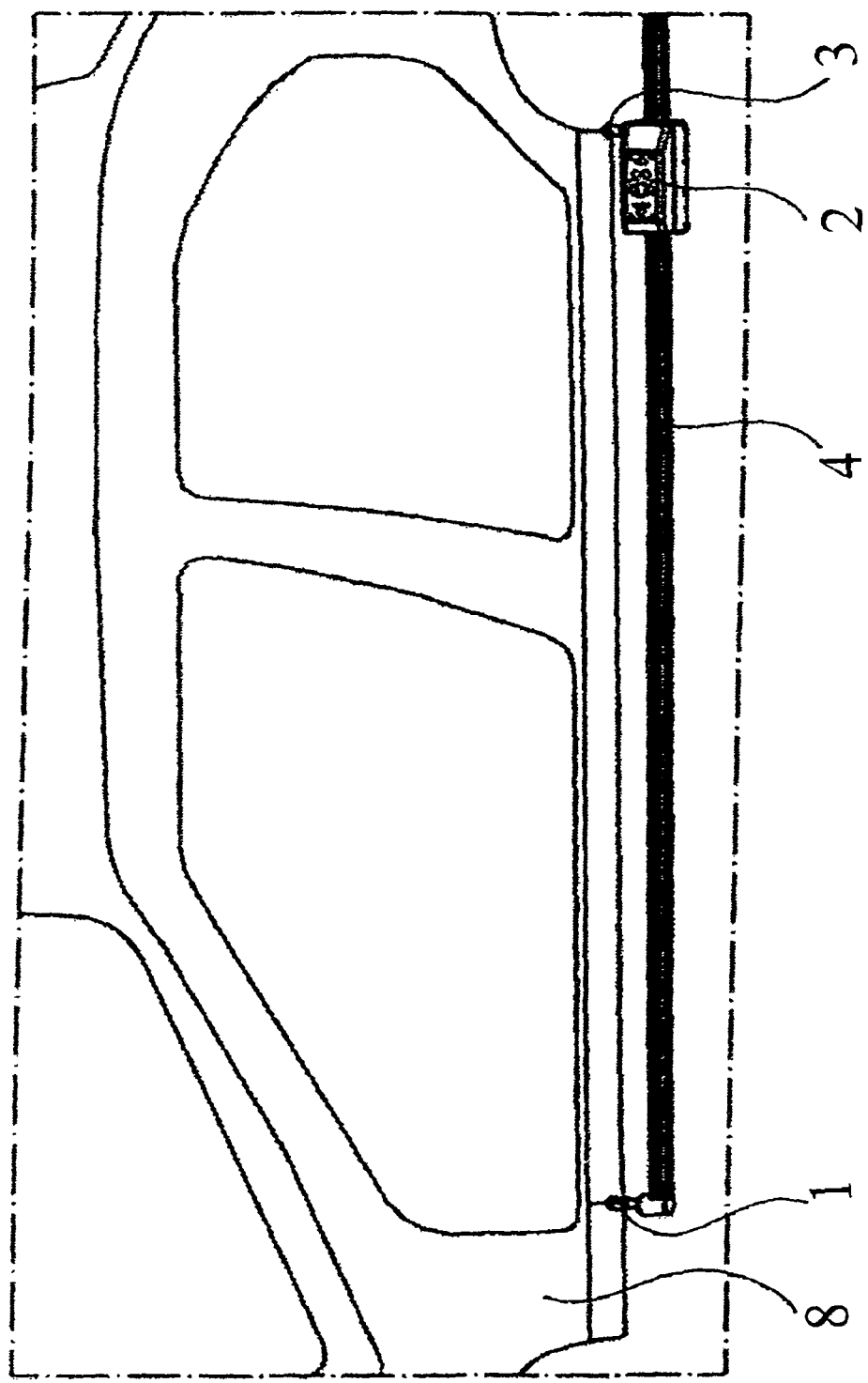
Figure 12:
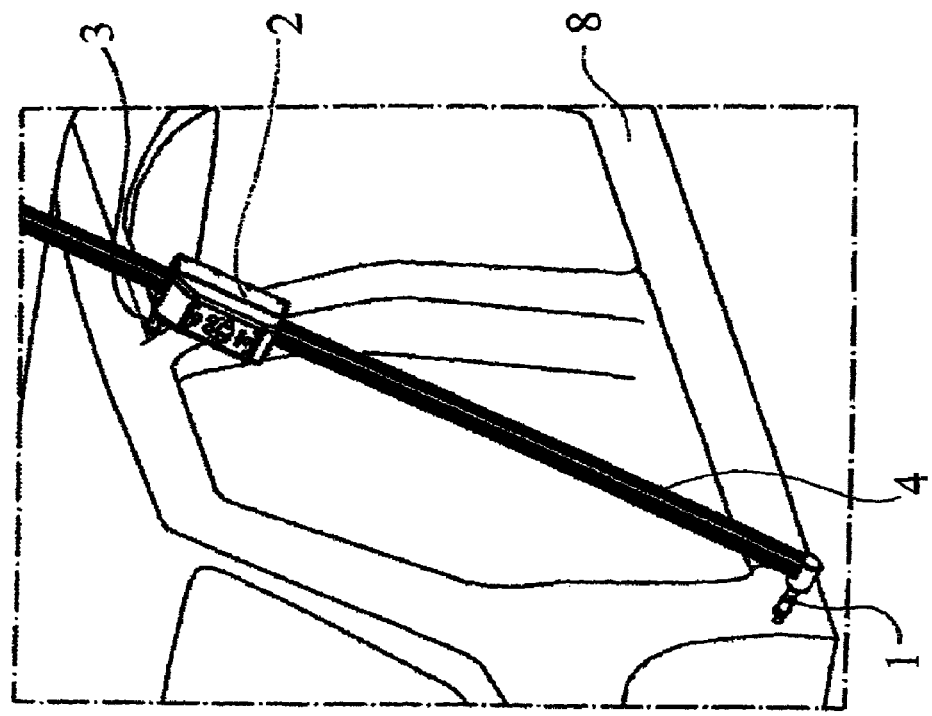
Figure 11:
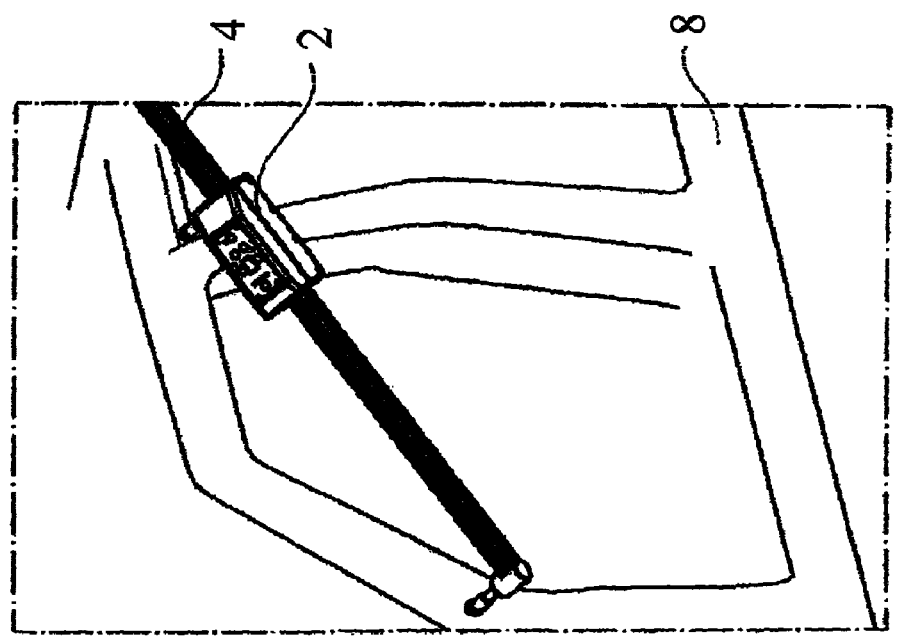
Figure 13:
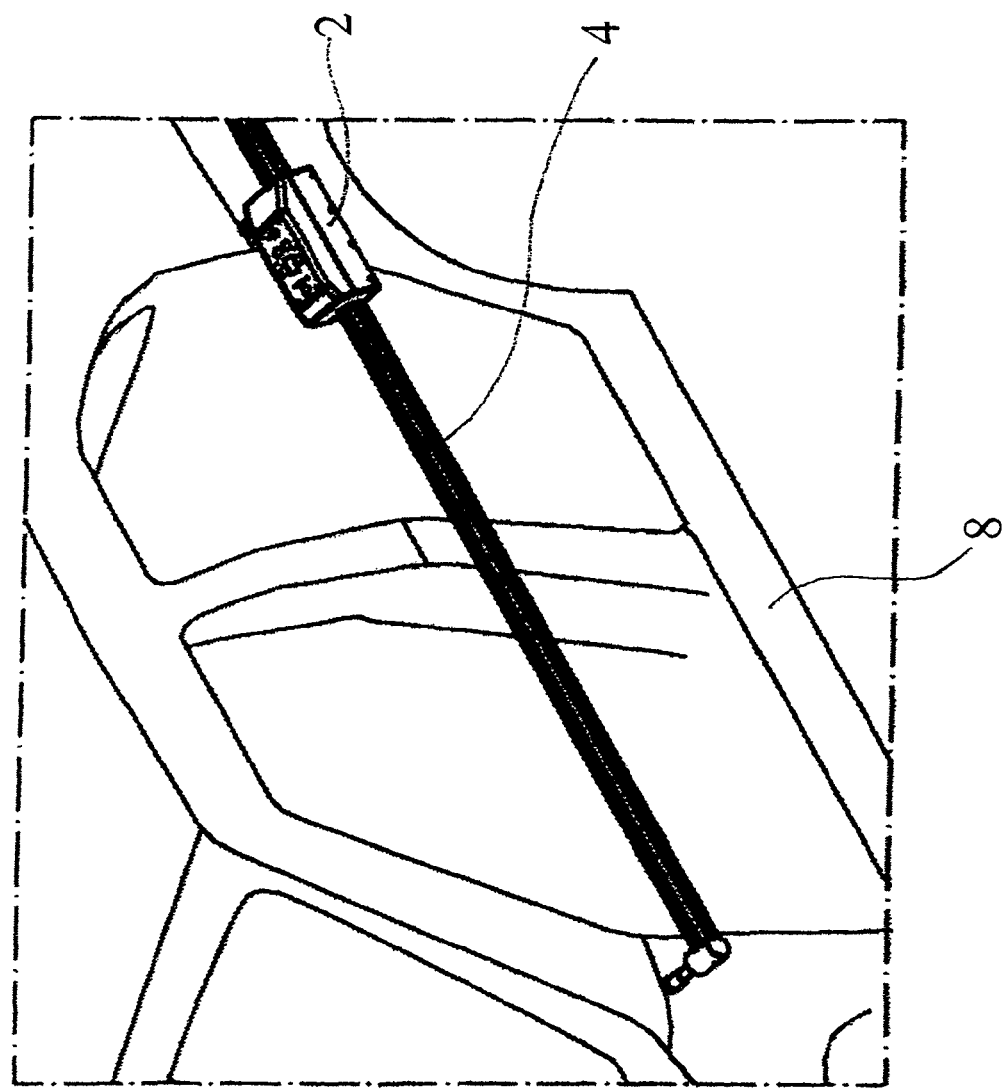

FIG. 9 shows by way of examples various measurement targets from different sides of the vehicle 8 for measuring the body and the chassis of the vehicle. FIGS. 10-13 show by way of examples various measuring situations for measuring the body and the chassis of the vehicle. The measurement targets can be located e.g. at the corners of the vehicle roof, at the corners of the engine compartment, inter alia, in the retaining bolts of the wings, in the vehicle chassis in the retaining bolts of the suspension member, or other bolts/holes in the chassis. Naturally, the measurement targets can also be in other points of the vehicle.

The method and the device according to the invention are intended to be used for measuring a vehicle and particularly for measuring an automobile. This technique and described device can also be used for other measuring which requires measuring inclination/height and length by altering the measurement software of the computer according to requirements.

The invention is not limited to the described advantageous embodiment, but it can vary within the scope of the inventive idea presented in the claims.

The invention claimed is:

1. A method for measuring a damaged vehicle, in which
a measuring device is calibrated and an inclination of the vehicle is measured in longitudinal and lateral directions,
the measured inclination of the vehicle is used as a datum plane,
with a measuring sensor of the measuring device are measured distances of measuring points of the damaged vehicle and the measured data are compared to registered reference values of the measuring points, and with an inclination sensor of the measuring device is measured inclination of the measuring device,
after calibration first measuring head of the measuring device is directed and set on a measurement target, starting point, chosen from an undamaged area of the vehicle,
second measuring head is directed and set on a second measurement target, end point, chosen from an area desired to measure,
with the measurement device are simultaneously measured the distance of the measurement points and the inclination of the damaged vehicle,
with at least one inclination sensor is measured the inclinations in the directions of two axis at the minimum by measuring the inclinations of at least two axis in the length direction of a profile of the measurement device, whereby the first axis shows the inclination used for calculating the height in the vertical direction and the second axis shows the inclination used for calculating height in the lateral direction in relation to the profile,
measuring the damaged vehicle in different directions and points,
measured dimensions are transferred to central processing unit, and
height difference of the measurement points is calculated from the values of the starting point, the distance between the measuring points and the inclination.

2. A device for measuring a vehicle, which device includes
a measuring rod in which there are measuring heads movable in relation to each other for measuring distances of measuring points of the vehicle,
a central processing unit,
sensors connected to the central processing unit which includes sensors for measuring distance between the measuring heads and inclination sensors for measuring inclination of the measuring rod,
the inclination sensors include at least one sensor measuring at least two axis of the measuring rod or two sensors measuring one axis of the measuring rod for measuring the inclination of the measuring rod both in vertical direction and in lateral direction,
and that the measuring device contains an operating panel for remote-controlling functions and that the central processing unit is arranged to communicate with computers wirelessly.

* * * * *